(12) United States Patent
Kobayashi

(10) Patent No.: US 9,915,840 B2
(45) Date of Patent: Mar. 13, 2018

(54) LIQUID CRYSTAL DISPLAY DEVICE

(71) Applicant: Japan Display Inc., Minato-ku (JP)

(72) Inventor: Junichi Kobayashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 512 days.

(21) Appl. No.: 14/257,082

(22) Filed: Apr. 21, 2014

(65) Prior Publication Data

US 2014/0354928 A1 Dec. 4, 2014

(30) Foreign Application Priority Data

May 31, 2013 (JP) .................................. 2013-116177

(51) Int. Cl.
*G02F 1/1339* (2006.01)
*G02F 1/1335* (2006.01)
*G02F 1/1333* (2006.01)
*G02F 1/1345* (2006.01)

(52) U.S. Cl.
CPC ...... *G02F 1/1339* (2013.01); *G02F 1/133553* (2013.01); *G02F 1/1345* (2013.01); *G02F 2001/133388* (2013.01)

(58) Field of Classification Search
CPC ............. G02F 1/1339; G02F 1/133553; G02F 1/0107; G02F 1/135; G02F 1/1341; G02F 2001/133388; G02F 2001/136218; G02F 2201/12; H01L 51/524; H01L 51/5246; H01J 9/261
USPC .......................... 349/113, 149, 151, 153, 190
See application file for complete search history.

(56) References Cited

U.S. PATENT DOCUMENTS

| 6,266,116 | B1 | 7/2001 | Ohta et al. |
| 7,230,669 | B1 | 6/2007 | Tashiro et al. |
| 7,880,854 | B2 * | 2/2011 | Kondo .................. G02F 1/1339 349/153 |
| 7,898,631 | B2 * | 3/2011 | Yang ..................... G02F 1/1339 349/149 |

(Continued)

FOREIGN PATENT DOCUMENTS

| JP | 05-127175 A | 5/1993 |
| JP | 6-222397 | 8/1994 |

(Continued)

OTHER PUBLICATIONS

Office Action dated Mar. 15, 2017 in Japanese Patent Application 2013-116177 with English Translation.

*Primary Examiner* — Michael Caley
*Assistant Examiner* — Angela Davison
(74) *Attorney, Agent, or Firm* — Oblon, McClelland, Maier & Neustadt, L.L.P.

(57) ABSTRACT

According to one embodiment, a liquid crystal display device includes a first substrate including an outer peripheral wiring which is formed along an outer periphery of an active area that displays an image, and which has a first reflective surface, a second substrate including a reflective layer which is formed by a plurality of segments that are mutually spaced apart, and which has a second reflective surface opposed to the first reflective surface, a sealant formed of a photosensitive resin material, which surrounds the active area, is formed along the outer peripheral wiring, and attaches the first substrate and the second substrate, and a liquid crystal layer held in a cell gap in an inside surrounded by the sealant.

5 Claims, 7 Drawing Sheets

(56) References Cited

U.S. PATENT DOCUMENTS

| | | |
|---|---|---|
| 2001/0010575 A1 | 8/2001 | Yoshida et al. |
| 2002/0196393 A1 | 12/2002 | Tashiro et al. |
| 2004/0165136 A1 | 8/2004 | Sugiyama et al. |
| 2005/0162893 A1 | 7/2005 | Yagi et al. |
| 2005/0206824 A1 | 9/2005 | Son et al. |
| 2005/0219453 A1 | 10/2005 | Kubo et al. |
| 2006/0176439 A1 | 8/2006 | Tashiro et al. |
| 2007/0013862 A1 | 1/2007 | Tashiro et al. |
| 2007/0115234 A1 | 5/2007 | Kim et al. |
| 2007/0211197 A1 | 9/2007 | Tashiro et al. |
| 2008/0062358 A1 | 3/2008 | Lee et al. |
| 2008/0123042 A1 | 5/2008 | Tashiro et al. |
| 2008/0137027 A1 | 6/2008 | Tashiro et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2008/0188157 A1 | 8/2008 | Tashiro et al. |
| 2008/0309841 A1 | 12/2008 | Yagi et al. |
| 2010/0134746 A1 | 6/2010 | Tashiro et al. |
| 2010/0134747 A1 | 6/2010 | Tashiro et al. |
| 2011/0025937 A1 | 2/2011 | Yagi et al. |

FOREIGN PATENT DOCUMENTS

| | | |
|---|---|---|
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2003-043497 A | 2/2003 |
| JP | 2005-003802 | 1/2005 |
| JP | 3644653 | 5/2005 |
| JP | 2005-242307 | 9/2005 |
| JP | 2008-152261 A | 7/2008 |
| JP | 2010-113377 | 5/2010 |
| JP | 2011-150187 A | 8/2011 |
| WO | WO 2013/021866 A1 | 2/2013 |

* cited by examiner

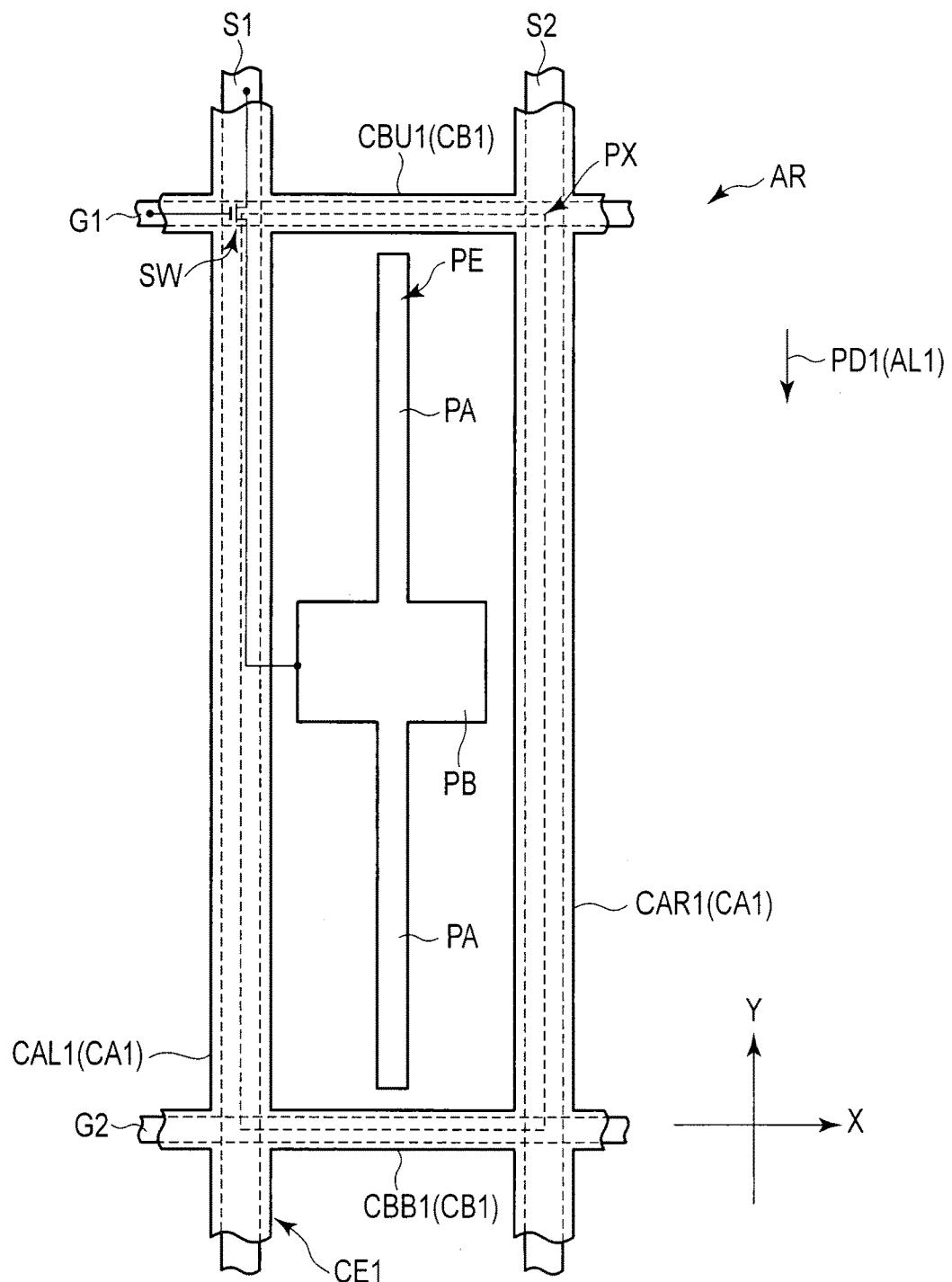
F I G. 2

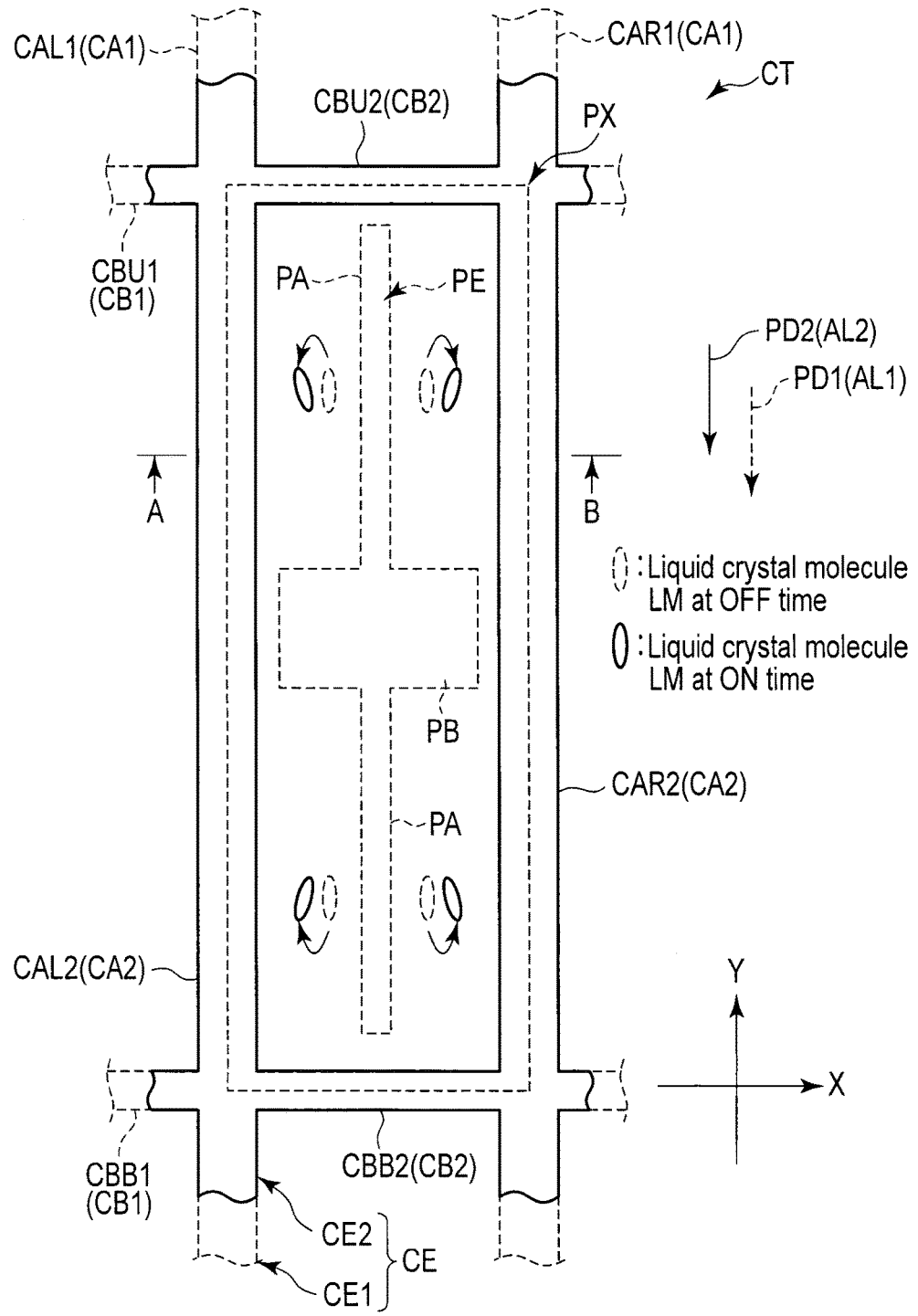
F I G. 3

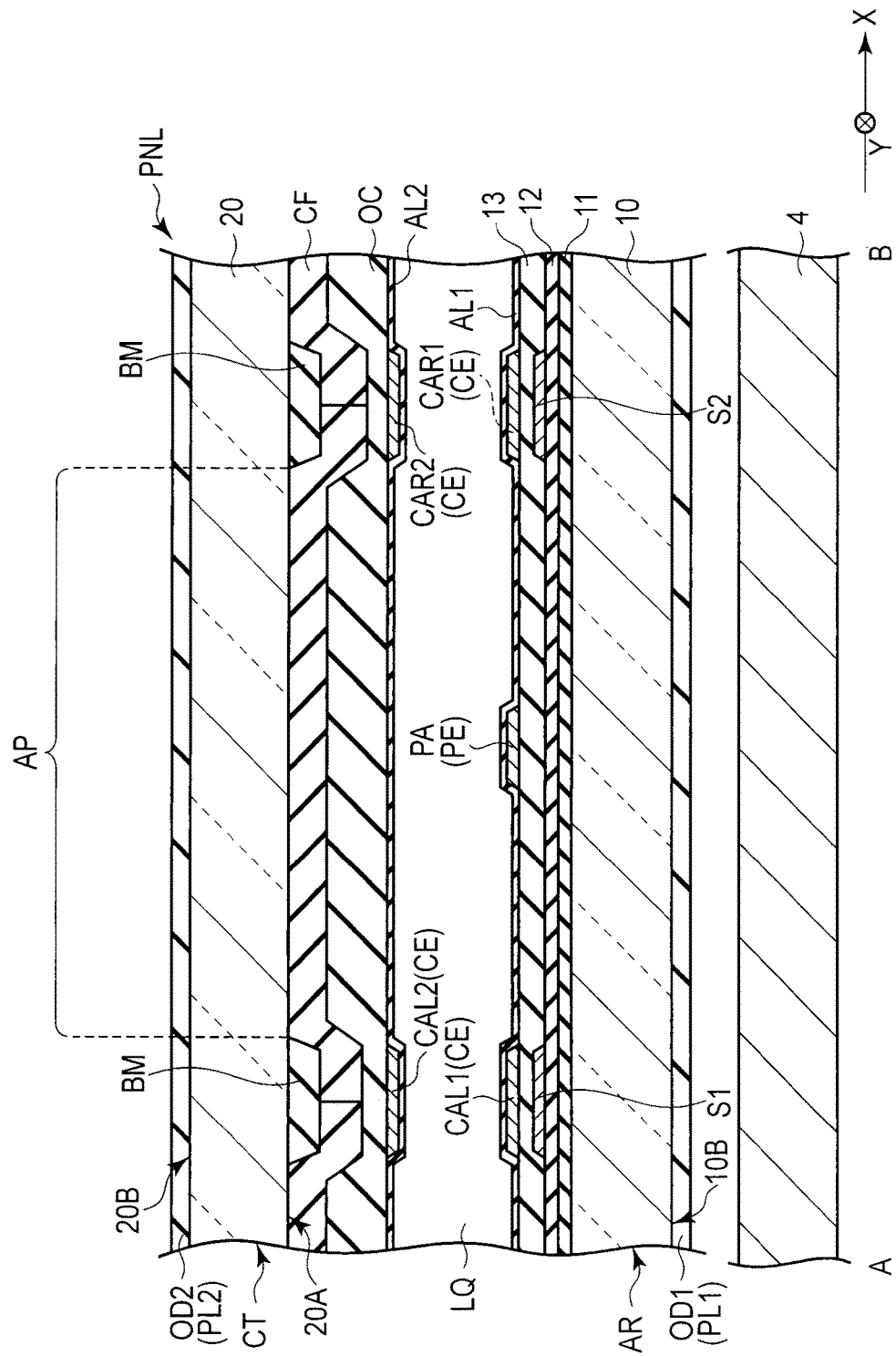
F I G. 4

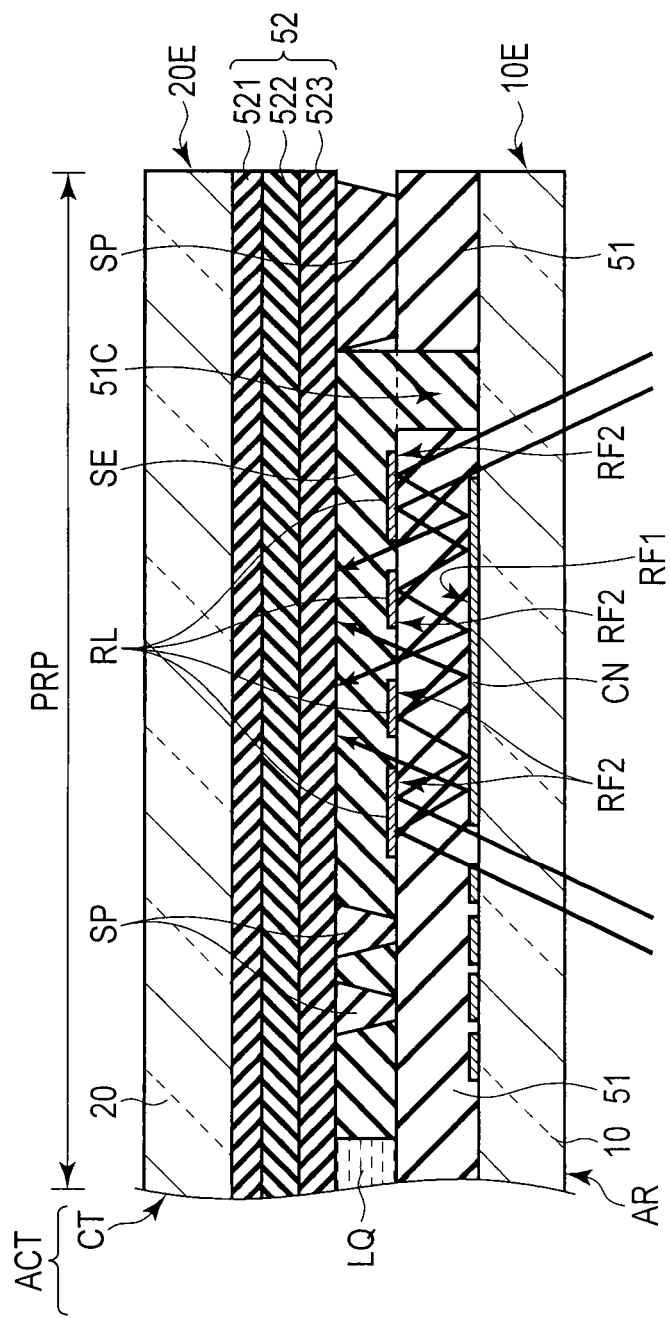
F I G. 5

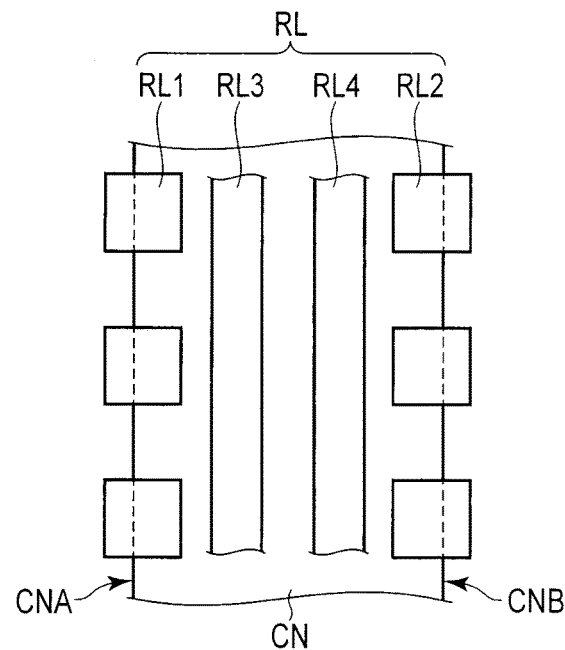
F I G. 6
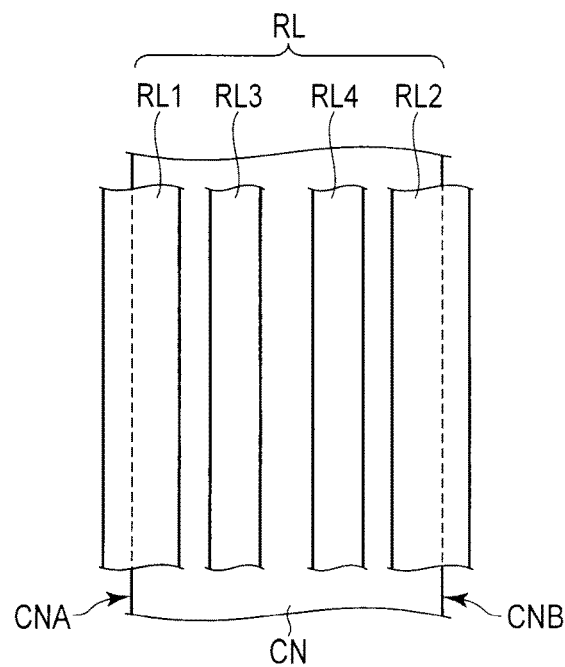
F I G. 7

LIQUID CRYSTAL DISPLAY DEVICE

CROSS-REFERENCE TO RELATED APPLICATIONS

This application is based upon and claims the benefit of priority from Japanese Patent Application No. 2013-116177, filed May 31, 2013, the entire contents of which are incorporated herein by reference.

FIELD

Embodiments described herein relate generally to a liquid crystal display device.

BACKGROUND

Liquid crystal display devices are used as display devices in various fields. A pair of substrates, which constitute a liquid crystal display panel, are attached by a sealant in a state in which a cell gap for holding a liquid crystal layer is created therebetween. The sealant is formed of a photosensitive resin material such as an ultraviolet-curing resin.

In recent years, there is a tendency that a picture frame of the liquid crystal display panel, that is, a width from an active area to a panel end, becomes smaller. Thus, in many cases, the sealant is disposed in a manner to overlap an outer peripheral wiring which is located on the outside of the active area. In the case where the sealant is located above the outer peripheral wiring, since the outer peripheral wiring is formed of a light-shielding wiring material, light, which is radiated in order to cure the sealant, is blocked by the outer peripheral wiring, and hardly reaches the sealant. Consequently, there is a case in which a part of the sealant becomes non-cured. If the non-cured sealant comes in contact with the liquid crystal layer, there is a concern that impurities contained in the sealant cause contamination of the liquid crystal layer. In addition, there is a concern that the non-cured sealant causes a decrease in adhesive strength for attaching the paired substrates, and a decrease in adhesion to each substrate, thus degrading reliability.

Thus, it has been proposed to provide a slit in a wiring line which overlaps the sealant, thereby making it easier to radiate light on the sealant. However, due to a demand for a narrower picture frame, it is difficult to increase the width of a wiring line, and there is a tendency that it becomes difficult to provide a slit in a wiring line, from the standpoint of stability in potential, etc.

On the other hand, as regards a liquid crystal display device including a light-shield film having a light-shield area in which a red color layer, a green color layer and a blue color layer overlap, there has been proposed a technique in which only the blue color layer is formed in that area of the light-shield film, which is in contact with the sealant, and the light-curing material of the sealant is configured to have a photoreaction region at wavelengths of a blue band.

BRIEF DESCRIPTION OF THE DRAWINGS

FIG. 2 is a plan view which schematically shows a structure example of one pixel PX at a time when an array substrate AR shown in FIG. 1 is viewed from a counter-substrate side.

FIG. 3 is a plan view which schematically shows a structure example of one pixel PX in a counter-substrate CT shown in FIG. 1.

FIG. 4 is a schematic cross-sectional view, taken along line A-B in FIG. 3, showing a cross-sectional structure of a liquid crystal display panel PNL shown in FIG. 3.

FIG. 5 is a cross-sectional view which schematically illustrates an example of the structure of a peripheral area PRP of the display panel PNL shown in FIG. 1.

FIG. 6 is a plan view which schematically illustrates an example of a positional relationship between a reflective layer RL and an outer peripheral wiring CN shown in FIG. 5.

FIG. 7 is a plan view which schematically illustrates another example of the positional relationship between the reflective layer RL and outer peripheral wiring CN shown in FIG. 5.

DETAILED DESCRIPTION

Figure 1:
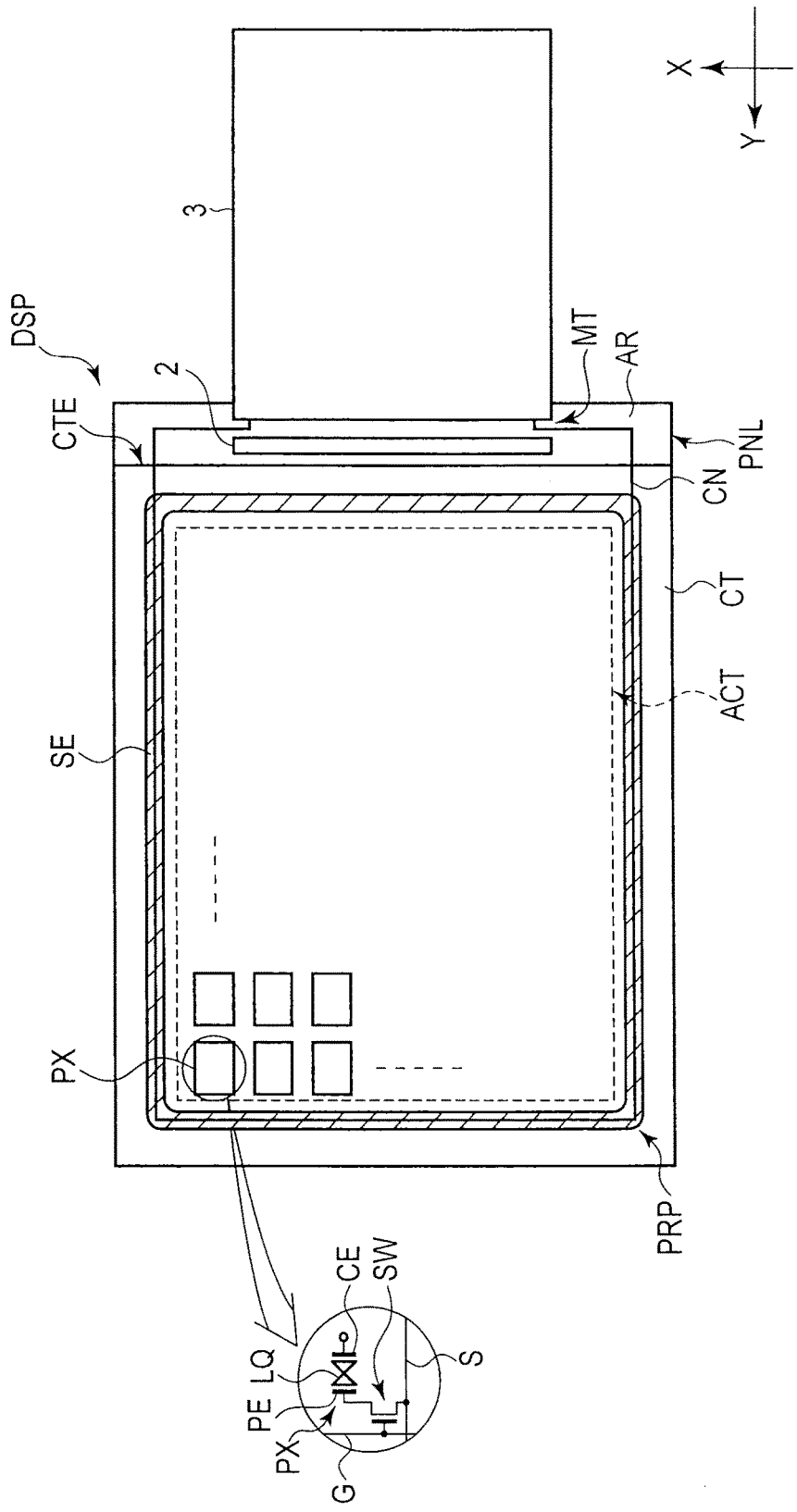
FIG. 1 is a plan view which schematically illustrates an example of a liquid crystal display device DSP according to an embodiment.

In general, according to one embodiment, a liquid crystal display device includes: a first substrate including an outer peripheral wiring which is formed along an outer periphery of an active area that displays an image, and which has a first reflective surface; a second substrate including a reflective layer which is formed by a plurality of segments that are mutually spaced apart, and which has a second reflective surface opposed to the first reflective surface; a sealant formed of a photosensitive resin material, which surrounds the active area, is formed along the outer peripheral wiring, and attaches the first substrate and the second substrate in a state in which a cell gap is created between the first substrate and the second substrate; and a liquid crystal layer held in the cell gap in an inside surrounded by the sealant.

According to another embodiment, a liquid crystal display device includes: a first substrate including a main pixel electrode disposed in an active area that displays an image, and an outer peripheral wiring which is formed along an outer periphery of the active area; a second substrate including second main common electrodes located on both sides of the main pixel electrode, and a reflective layer which is formed by a plurality of segments that are mutually spaced apart, and which is opposed to the outer peripheral wiring; a sealant formed of a photosensitive resin material, which surrounds the active area, is formed along the outer peripheral wiring, and attaches the first substrate and the second substrate in a state in which a cell gap is created between the first substrate and the second substrate; and a liquid crystal layer held in the cell gap in an inside surrounded by the sealant.

According to another embodiment, a liquid crystal display device includes: a first substrate including an outer peripheral wiring which is formed along an outer periphery of an active area that displays an image, and which has a first reflective surface, and the first substrate including a first insulation film covering the outer peripheral wiring; a second substrate including a second insulation film opposed to the first insulation film; a reflective layer which is located between the first insulation film and the second insulation film and is formed by a plurality of segments that are mutually spaced apart, the reflective layer having a second reflective surface opposed to the first reflective surface; a sealant formed of a photosensitive resin material, which surrounds the active area, is formed along the outer peripheral wiring, and attaches the first substrate and the second substrate in a state in which a cell gap is created between the first substrate and the second substrate; and a liquid crystal layer held in the cell gap in an inside surrounded by the sealant.

An embodiment will be described hereinafter with reference to the accompanying drawings. In the drawings, structural elements having the same or similar functions are denoted by like reference numerals, and an overlapping description is omitted.

FIG. 1 is a plan view which schematically illustrates an example of a liquid crystal display device DSP according to an embodiment.

Specifically, the liquid crystal display device DSP includes a display panel PNL. The display panel PNL is an active-matrix-type liquid crystal display panel, and includes an array substrate AR, a counter-substrate CT which is disposed to be opposed to the array substrate AR, and a liquid crystal layer LQ which is held between the array substrate AR and the counter-substrate CT. The array substrate AR and the counter-substrate CT are attached by a sealant SE in a state in which a predetermined cell gap is formed between the array substrate AR and the counter-substrate CT. The cell gap is formed by columnar spacers (not shown) which are formed on the array substrate AR or counter-substrate CT. The liquid crystal layer LQ is held in an inside surrounded by the sealant SE in the cell gap between the array substrate AR and the counter-substrate CT. The display panel LPN includes an active area ACT, which displays an image, in the inside surrounded by the sealant SE. The active area ACT has, for example, a substantially rectangular shape, and is composed of a plurality of pixels PX which are arrayed in a matrix.

The array substrate AR includes gate lines G extending in a first direction X, source lines S which extend in a second direction Y crossing the first direction X and cross the gate lines G, a switching element SW which is connected to the gate line G and source line S, and a pixel electrode PE which is connected to the switching element SW. A common electrode CE, which is opposed to each pixel electrode PE via the liquid crystal layer LQ, is provided, for example, on the counter-substrate CT, but the common electrode CE may be provided on the array substrate AR.

Although a description of the detailed structure of the display panel PNL is omitted, in a mode which mainly uses a vertical electric field, such as a TN (Twisted Nematic) mode, an OCB (Optically Compensated Bend) mode or a VA (Vertical Aligned) mode, the pixel electrode PE is provided on the array substrate AR, while at least a part of the common electrode CE is provided on the counter-substrate CT. In addition, in a mode which mainly uses a lateral electric field, such as an IPS (In-Plane Switching) mode or an FFS (Fringe Field Switching) mode, both the pixel electrode PE and counter-electrode CE are provided on the array substrate AR.

In addition, each pixel PX can be configured as a transmissive type which selectively transmits light from a backlight (not shown), a reflective type which selectively reflects ambient light that is incident from the counter-substrate side, or a transflective type having functions of both the transmissive type and the reflective type. In the case of the transmissive type, the pixel electrode PE is formed of a transparent, electrically conductive material such as indium tin oxide (ITO) or indium zinc oxide (IZO). In the case of the reflective type, the pixel electrode PE is formed of a metallic material with a high reflectance (or a low transmittance), such as titanium (Ti), aluminum (Al), molybdenum (Mo), tungsten (W) or silver (Ag). In the case of the transflective type, the pixel electrode PE is formed of a combination of the above-described transparent, electrically conductive material and the metallic material with a high reflectance.

The common electrode CE is, in usual cases, formed of a transparent, electrically conductive material such as ITO or IZO. However, in such a configuration that the common electrode CE is disposed in an area which does not contribute to display, the common electrode CE may be formed of a metallic material with a high reflectance, such as titanium (Ti), aluminum (Al), molybdenum (Mo), tungsten (W) or silver (Ag).

Signal supply sources, such as a driving IC chip 2 and a flexible printed circuit (FPC) board 3, which supply necessary signals for driving the display panel PNL, are mounted on a peripheral area PRP on the outside of the active area ACT. In the example illustrated, the driving IC chip 2 and FPC board 3 are mounted on a mounting portion MT of the array substrate AR, which extends outward from a substrate end portion CTE of the counter-substrate CT. The peripheral area PRP is an area surrounding the active area ACT, includes an area where the sealant SE is disposed, and is formed in a rectangular frame shape. In the meantime, the display panel PNL illustrated is rectangular and, as regards the three sides thereof excluding the mounting portion MT, substrate end portions of the array substrate AR overlap substrate end portions of the counter-substrate CT, thus forming panel end portions.

The sealant SE is formed along the substrate end portion CTE at the mounting portion MT, and is formed along the panel end portions at the three sides excluding the mounting portion MT. In the example illustrated, the sealant SE is formed to have a rectangular, closed-loop shape. The sealant SE is formed of, for example, a photosensitive resin material such as an ultraviolet-curing resin.

The array substrate AR further includes an outer peripheral wiring CN which is formed along the outer periphery of the active area ACT. The outer peripheral wiring CN is located in the peripheral area PRP, is formed along the three sides of the array substrate AR, excluding the mounting portion MT, and is connected to a signal supply source, for example, the FPC substrate 3, at the mounting portion MT. In addition, the outer peripheral wiring CN is disposed along the sealant SE, and a part of the outer peripheral wiring CN is formed at a position overlapping the sealant SE. The outer peripheral wiring CN is, for instance, a common line to which to which a common potential is supplied, and is electrically connected to the common electrode CE, etc. Besides, at least a part of the outer peripheral wiring CN is formed of the same wiring material as the gate line G or source line S (a metallic material with a high reflectance, which hardly passes light, such as aluminum, titanium, molybdenum, tungsten, or silver).

Next, a structure example of one pixel disposed in the active area will be described.

FIG. 2 is a plan view which schematically shows a structure example of one pixel PX at a time when the array substrate AR shown in FIG. 1 is viewed from the counter-substrate side. FIG. 2 is a plan view in an X-Y plane.

The array substrate AR includes a gate line G1, a gate line G2, a source line S1, a source line S2, a switching element SW, a pixel electrode PE, and a first alignment film AL1. In the structure example illustrated, the array substrate AR further includes a first common electrode CE1 which is a part of the common electrode CE, but this first common electrode CE1 may be omitted.

The switching element SW, in the illustrated example, is electrically connected to the gate line G1 and source line S1. The pixel electrode PE includes a main pixel electrode PA and a sub-pixel electrode PB. The main pixel electrode PA and sub-pixel electrode PB are formed integral or continuous, and are electrically connected to each other.

The main pixel electrode PA is located between the source line S1 and source line S2, and linearly extends in the second direction Y to the vicinity of the upper side end portion of the pixel PX and to the vicinity of the lower side end portion of the pixel PX. In the example illustrated, the main pixel electrode PA is located at a substantially middle point between the source line S1 and source line S2. The main pixel electrode PA is formed in a strip shape having a substantially uniform width in the first direction X.

The sub-pixel electrode PB is located at a substantially central part of the pixel PX, and linearly extends in the first direction X. In the example illustrated, the sub-pixel electrode PB crosses a substantially middle portion in the second direction Y of the main pixel electrode PA. The sub-pixel electrode PB is formed in a strip shape having a substantially uniform width in the second direction Y. Although the pixel electrode PE is formed in a cross shape in the example illustrated, the shape of the pixel electrode PE is not limited to this example.

The first common electrode CE1 includes a first main common electrode CA1 and a first sub-common electrode CB1. The first main common electrode CA1 and first sub-common electrode CB1 are formed integral or continuous, and are electrically connected to each other.

The first main common electrode CA1, in the X-Y plane, is located on both sides of the main pixel electrode PA, and linearly extends in the second direction Y. The first main common electrode CA1 is formed at a position opposed to the source line S, and is formed in a strip shape. In the example illustrated, the first main common electrode CA1 includes two first main common electrodes arranged in parallel with a distance in the first direction X, namely a first main common electrode CAL1 disposed at the left side end portion of the pixel PX, and a first main common electrode CAR1 disposed at the right side end portion of the pixel PX. The first main common electrode CAL1 is opposed to the source line S1, and the first main common electrode CAR1 is opposed to the source line S2.

The first sub-common electrode CB1, in the X-Y plane, is located on both sides of the sub-pixel electrode PB, and linearly extends in the first direction X. The first sub-common electrode CB1 is formed at a position opposed to the gate line G, and is formed in a strip shape. In the example illustrated, the first sub-common electrode CB1 includes two first sub-common electrodes arranged in parallel with a distance in the second direction Y, namely a first sub-common electrode CBU1 disposed at the upper side end portion of the pixel PX, and a first sub-common electrode CBB1 disposed at the lower side end portion of the pixel PX. The first sub-common electrode CBU1 is opposed to the gate line G1. The first sub-common electrode CBB1 is opposed to the gate line G2. In the example illustrated, the first common electrode CE1 is formed of the first main common electrode CA1 and first sub-common electrode CB1 in a grid shape which partitions the pixel PX, but the shape of the first common electrode CE1 is not limited to this example.

In the array substrate AR, the pixel electrode PE and first common electrode CE1 are covered with the first alignment film AL1. The first alignment film AL1 is subjected to alignment treatment in a first alignment treatment direction PD1 for initially aligning the liquid crystal molecules of the liquid crystal layer LQ.

FIG. 3 is a plan view which schematically shows a structure example of one pixel PX in the counter-substrate CT shown in FIG. 1. FIG. 3 shows a plan view in the X-Y plane. FIG. 3 shows only structural parts that are necessary for the description, and the pixel electrode PE and first common electrode CE1, which are main parts of the array substrate, are indicated by broken lines.

The counter-substrate CT includes a second common electrode CE2 which is a part of the common electrode CE. The second common electrode CE2 includes a second main common electrode CA2 and a second sub-common electrode CB2. The second main common electrode CA2 and second sub-common electrode CB2 are formed integral or continuous, and are electrically connected to each other. The second main common electrode CA2 and second sub-common electrode CB2 are electrically connected to the first common electrode CE1 which is provided on the array substrate, for example, on the outside of the active area, and have the same potential as the first common electrode CE1.

The second main common electrode CA2, in the X-Y plane, is located on both sides of the main pixel electrode PA, and linearly extends in the second direction Y. The second main common electrode CA2 is formed at a position opposed to the first main common electrode CA1, and is formed in a strip shape. In the example illustrated, the second main common electrode CA2 includes two second main common electrodes arranged in parallel with a distance in the first direction X, namely a second main common electrode CAL2 disposed at the left side end portion of the pixel PX, and a second main common electrode CAR2 disposed at the right side end portion of the pixel PX. The second main common electrode CAL2 is opposed to the first main common electrode CAL1. The second main common electrode CAR2 is opposed to the first main common electrode CAR1.

The second sub-common electrode CB2, in the X-Y plane, is located on both sides of the sub-pixel electrode PB, and linearly extends in the first direction X. The second sub-common electrode CB2 is formed at a position opposed to the first sub-common electrode CB1, and is formed in a strip shape. In the example illustrated, the second sub-common electrode CB2 includes two second sub-common electrodes arranged in parallel with a distance in the second direction Y, namely a second sub-common electrode CBU2 disposed at the upper side end portion of the pixel PX, and a second sub-common electrode CBB2 disposed at the lower side end portion of the pixel PX. The second sub-common electrode CBU2 is opposed to the first sub-common electrode CBU1, and the second sub-common electrode CBB2 is opposed to the first sub-common electrode CBB1. In the example illustrated, the second common electrode CE2 is formed of the second main common electrode CA2 and second sub-common electrode CB2 in a grid shape which partitions the pixel PX, but the shape of the second common electrode CE2 is not limited to this example.

In the counter-substrate CT, the second common electrode CE2 is covered with the second alignment film AL2. The second alignment film AL2 is subjected to alignment treatment in a second alignment treatment direction PD2 for initially aligning the liquid crystal molecules of the liquid crystal layer LQ. The second alignment treatment direction PD2, in which the second alignment film AL2 initially aligns the liquid crystal molecules, is, for example, parallel to the first alignment treatment direction PD1.

FIG. 4 is a schematic cross-sectional view, taken along line A-B in FIG. 3, showing a cross-sectional structure of the liquid crystal display panel LPN shown in FIG. 3. FIG. 4 shows only parts which are necessary for the description.

A backlight 4 is disposed on the back side of the array substrate AR which constitutes the liquid crystal display panel LPN. Various modes are applicable to the backlight 4. A description of the detailed structure of the backlight 4 is omitted.

The array substrate AR is formed by using a first insulative substrate 10 which is transparent. The array substrate AR includes, on the inside of the first insulative substrate 10, that is, on the side facing the counter-substrate CT, a source line S1, a source line S2, a pixel electrode PE, a first common electrode CE1, a first insulation film 11, a second insulation film 12, a third insulation film 13, and a first alignment film AL1.

Although not illustrated, a semiconductor layer of polysilicon of the switching element is formed between the first insulative substrate 10 and first insulation film 11, and gate lines are formed on the first insulation film 11 and are covered with the second insulation film 12. The source line S1 and source line S2 are formed on the second insulation film 12 and are covered with the third insulation film 13. The third insulation film 13 is formed of, for example, a transparent resin material.

The pixel electrode PE and the first common electrode CE1 are formed on the third insulation film 13. The pixel electrode PE and first common electrode CE1 are formed in the same layer and are formed by using the same material. The first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE and the first common electrode CE1, and is also disposed on the third insulation film 13. The first alignment film AL1 is formed of a material which exhibits horizontal alignment properties.

The counter-substrate CT is formed by using a second insulative substrate 20 which is transparent. The counter-substrate CT includes a black matrix BM, a color filter CF, an overcoat layer OC, second common electrode CE2 and second alignment film AL2, on the inside of the second insulative substrate 20, that is, on that side of the second insulative substrate 20, which is opposed to the array substrate AR.

The black matrix BM is disposed on an inner surface 20A of the second insulative substrate 20, which is opposed to the array substrate AR, partitions each pixel PX, and forms an aperture portion AP. Specifically, the black matrix BM is disposed so as to be opposed to wiring portions, such as the source lines S, gate lines G and switching elements SW. The black matrix BM is formed of, for example, a resin material colored in black, or a light-shielding metallic material such as chromium (Cr).

The color filter CF is disposed in association with each pixel PX. Specifically, the color filter CF is disposed on an inside partitioned by the black matrix BM on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF. The overcoat layer OC is formed of, for example, a transparent resin material.

The second common electrode CE2 is formed on that side of the overcoat layer OC, which is opposed to the array substrate AR, and is located below the black matrix BM. In the aperture portion AP, regions between the pixel electrode PE and the first common electrode CE1 and second common electrode CE2 correspond to transmissive regions through which backlight can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the second common electrode CE2 and the overcoat layer OC. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a cell gap of, e.g. 2 to 7 μm is created. The liquid crystal layer LQ is held in the cell gap which is created between the array substrate AR and the counter-substrate CT, and is disposed between the first alignment film AL1 and second alignment film AL2.

A first optical element OD1 including a first polarizer PL1 is attached to an outer surface 10B of the first insulative substrate 10. A second optical element OD2 including a second polarizer PL2 is attached to an outer surface 20B of the second insulative substrate 20.

FIG. 5 is a cross-sectional view which schematically illustrates an example of the structure of the peripheral area PRP of the display panel PNL shown in FIG. 1.

In the peripheral area PRP, the array substrate AR includes an outer peripheral wiring CN and a first peripheral insulation film 51, on that side of the first insulative substrate 10, which is opposed to the counter-substrate CT.

Although the outer peripheral wiring CN is disposed at a relatively high density in the peripheral area PRP, the outer peripheral wiring CN, in this example, corresponds to a wiring line with a relatively large line width, for example, a common line. The outer peripheral wiring CN is formed in the same layer as the gate line or source line. In the case where the outer peripheral wiring CN is formed in the same layer as the gate line, both the outer peripheral wiring CN and the gate line are formed on the first insulation film 11 shown in FIG. 4 and are covered with the second insulation film 12. In the case where the outer peripheral wiring CN is formed in the same layer as the source line, the outer peripheral wiring CN and the source line are formed on the second insulation film 12 and are covered with the third insulation film 13.

Incidentally, in the example illustrated in FIG. 5, for the purpose of simple description, the outer peripheral wiring CN is located on the first insulative substrate 10. However, some other insulation film may be interposed between the first insulative substrate 10 and the outer peripheral wiring CN. The outer peripheral wiring CN has a first reflective surface RF1. The first reflective surface RF1 corresponds to a front surface of the outer peripheral wiring CN, that is, a surface opposed to the counter-substrate CT.

The first peripheral insulation film 51 covers the outer peripheral wiring CN. Specifically, the first reflective surface RF1 is covered with the first peripheral insulation film 51. The first peripheral insulation film 51 is transparent. Alternatively, the first peripheral insulation film 51 has transmissivity with a high transmittance to wavelengths of light that is necessary for curing a sealant to be described later. The first peripheral insulation film 51 is an extension portion of at least one of the first insulation film 11, second insulation film 12 and third insulation film 13 of the active area ACT, which extends from the active area ACT to the peripheral area PRP. The first peripheral insulation film 51 is disposed, not only on a side near the active area ACT, but also on a side near a substrate end portion 10E of the first insulative substrate 10. In the example illustrated, a trench portion 51C is formed in the first peripheral insulation film 51. The trench portion 51C has, for example, a depth reaching the first insulative substrate 10.

In the peripheral area PRP, the counter-substrate CT includes a second peripheral insulation film 52, etc., on that side of the second insulative substrate 20, which is opposed to the array substrate AR. The second peripheral insulation film 52 includes a peripheral light-shield layer 521, a peripheral color filter 522 and a peripheral overcoat layer 523. The second peripheral insulation film 52 extends to a substrate end portion 20E of the second insulative substrate 20.

The peripheral light-shield layer 521 is formed on that side of the second insulative substrate 20, which is opposed to the array substrate AR, and extends over substantially the entirety of the peripheral area PRP. In addition, the peripheral light-shield layer 521 is formed of the same material as the black matrix BM of the active area ACT, and is continuous with the black matrix BM.

The peripheral color filter 522 is stacked on the peripheral light-shield layer 521. In the example illustrated, the peripheral color filter 522 extends over the peripheral area PRP. In addition, the peripheral color filter 522 is formed of the same material as the color filter of any one of the colors of the color filter CF of the active area ACT. For example, the peripheral color filter 522 is formed of the same material as the blue color filter.

The peripheral overcoat layer 523 covers the peripheral color filter 522, and extends over substantially the entirety of the peripheral area PRP. In addition, the peripheral overcoat layer 523 is formed of the same material as the overcoat layer OC of the active area ACT, and is continuous with the overcoat layer OC.

In the peripheral area PRP, columnar spacers SP for keeping the cell gap are interposed between the first peripheral insulation film 51 and the second peripheral insulation film 52. In the example illustrated, the counter-substrate CT includes the columnar spacers SP in the peripheral area PRP. The columnar spacers SP are stacked on the peripheral overcoat layer 523, and are each formed in a tapering shape with a gradually decreasing thickness toward the array substrate AR. Distal end portions of the columnar spacers SP are put in contact with the first peripheral insulation film 51. In the peripheral area PRP, the columnar spacers SP are disposed both on the side near the active area ACT and on the side near the substrate end portion 20E, with the trench portion 51C being interposed. Incidentally, of the columnar spacers SP, while the columnar spacer SP on the side near the active area ACT has a distal end portion put in contact with the first peripheral insulation film 51, the columnar spacer SP on the side near the substrate end portion 20E may have a distal end portion spaced apart from the first peripheral insulation film 51. The columnar spacers SP may be provided on the array substrate AR. In this case, the columnar spacers SP are stacked on the first peripheral insulation film 51, and their distal end portions are put in contact with the second peripheral insulation film 52.

The sealant SE for attaching the array substrate AR and counter-substrate CT is interposed between the first peripheral insulation film 51 and the second peripheral insulation film 52. The sealant SE is located above the outer peripheral wiring CN, and is disposed so as to surround the columnar spacers SP which are located on the active area side. In addition, in the example illustrated, the sealant SE is also interposed between the trench portion 51C and the second peripheral insulation film 52. Incidentally, the sealant SE may be interposed between the distal end portion of the columnar spacer SP and the first peripheral insulation film 51.

The liquid crystal layer LQ is sealed on the inside, that is, on the active area side, of the sealant SE.

The liquid crystal display device of the present embodiment operates as follows. Specifically, in a state in which no voltage is applied to the liquid crystal layer LQ, that is, in a state (OFF time) in which no electric field is produced between the pixel electrode PE and common electrode CE, liquid crystal molecules LM of the liquid crystal layer LQ are aligned such that their major axes are positioned in the first alignment treatment direction PD1 of the first alignment film AL1 and the second alignment treatment direction PD2 of the second alignment film AL2. At this OFF time, part of light from the backlight 4 passes through the first polarizer PL1, and enters the liquid crystal display panel LPN. Since the polarization state of linearly polarized light, which has passed through the liquid crystal layer LQ, hardly varies, the linearly polarized light, which has passed through the liquid crystal display panel LPN, is absorbed by the second polarizer PL2 that is in a positional relationship of crossed Nicols in relation to the first polarizer PL1 (black display).

On the other hand, in a state in which a voltage is applied to the liquid crystal layer LQ, that is, in a state (ON time) in which a potential difference (or an electric field) is produced between the pixel electrode PE and the common electrode CE, a lateral electric field (or an oblique electric field), which is substantially parallel to the substrates, is produced between the pixel electrode PE and the common electrode CE. The liquid crystal molecules LM are affected by the electric field, and their major axes rotate in a plane substantially parallel to the X-Y plane, as indicated by solid lines in the Figure. At this time, a plurality of domains are formed in one pixel PX. Part of light, which has been made incident on the liquid crystal display panel LPN from the backlight 4, passes through the first polarizer PL1 and enters the liquid crystal display panel LPN. The polarization state of backlight entering the liquid crystal layer LQ varies, and the backlight passes through the second polarizer PL2 (white display).

In the present embodiment, a reflective layer RL is located between the first peripheral insulation film 51 and the second peripheral insulation film 52. In addition, the reflective layer RL has a second reflective surface RF2 which is opposed to the first reflective surface RF1. In the example illustrated in FIG. 5, the reflective layer RL is provided on the array substrate AR, and is formed on that surface of the first peripheral insulation film 51, which is opposed to the second peripheral insulation film 52. The second reflective surface RF2 corresponds to a back surface of the reflective layer RL, that is, a surface which is in contact with the first peripheral insulation film 51. The reflective layer RL is formed of a plurality of segments which are mutually spaced apart. In the illustrated cross section, the reflective layer RL is formed of four segments. Of these four segments, two segments located on both sides are opposed to both end portions of the outer peripheral wiring CN, include protrusion portions extending outward from both end portions of the outer peripheral wiring CN, and are formed in a shape of eaves in relation to the outer peripheral wiring CN. The reflective layer RL is formed of the same wiring material as the gate line G or source line S (a metallic material with a high reflectance, which hardly passes light, such as aluminum, titanium, molybdenum, tungsten, or silver).

In one mode, the outer peripheral wiring CN is formed on the first insulation film 11, and the reflective layer RL is formed on the second insulation film 12. In this case, the first peripheral insulation film 51 illustrated corresponds to the second insulation film 12. The outer peripheral wiring CN is formed of the same material as the gate line that is located in the same layer. The reflective layer RL is formed of the same material as the source line that is located in the same layer.

In another mode, the outer peripheral wiring CN is formed on the first insulation film 11, and the reflective layer RL is formed on the third insulation film 13. In this case, the first peripheral insulation film 51 corresponds to the second insulation film 12 and third insulation film 13. The outer peripheral wiring CN is formed of the same material as the gate line that is located in the same layer. The reflective layer RL is formed of the same material as the pixel electrode that is located in the same layer.

In still another mode, the outer peripheral wiring CN is formed on the second insulation film 12, and the reflective layer RL is formed on the third insulation film 13. In this case, the first peripheral insulation film 51 corresponds to the third insulation film 13. The outer peripheral wiring CN is formed of the same material as the source line that is located in the same layer. The reflective layer RL is formed of the same material as the pixel electrode that is located in the same layer.

In each of these modes, at least one insulation film is interposed between the outer peripheral wiring CN and the reflective layer RL.

FIG. 6 is a plan view which schematically illustrates an example of a positional relationship between the reflective layer RL and the outer peripheral wiring CN shown in FIG. 5.

In the example illustrated, the reflective layer RL is configured by combining segments each formed in an island shape, and segments each formed in a stripe shape. Specifically, the reflective layer RL includes segments RL1 which are opposed to an end portion CNA of the outer peripheral wiring CN, which is located on the active area side, segments RL2 which are opposed to an end portion CNB of the outer peripheral wiring CN, which is located on the substrate end portion side, and a segment RL3 and a segment RL4 which are located between the segments RL1 and segments RL2. Each of the segments RL1 and segments RL2 is formed in an island shape, and each of the segment RL3 and segment RL4 is formed in a stripe shape. Incidentally, the number of segments, which are located between the segments RL1 and segments RL2, is not limited to the example illustrated.

The segments RL1 are opposed to the outer peripheral wiring CN and the end portion CNA thereof, and also extend to the active area side from the end portion CNA. The segments RL2 are opposed to the outer peripheral wiring CN and the end portion CNB thereof, and also extend to the substrate end portion side from the end portion CNB. The segments RL1 and segments RL2 are discretely arranged, respectively, in the direction of extension of the outer peripheral wiring CN. The segment RL3 and segment RL4 linearly extend, respectively, in the direction of extension of the outer peripheral wiring CN.

FIG. 7 is a plan view which schematically illustrates another example of the positional relationship between the reflective layer RL and outer peripheral wiring CN shown in FIG. 5.

The example illustrated in FIG. 7 differs from the example illustrated in FIG. 6 in that each of the segment RL1 and segment RL2 is formed in a stripe shape. Specifically, the reflective layer RL is configured by segments each formed in a stripe shape. The segment RL1 is opposed to the outer peripheral wiring CN and the end portion CNA thereof, and also extends to the active area side from the end portion CNA. The segment RL2 is opposed to the outer peripheral wiring CN and the end portion CNB thereof, and also extends to the substrate end portion side from the end portion CNB. The segment RL1 and segment RL2 linearly extend, respectively, in the direction of extension of the outer peripheral wiring CN. The segment RL3 and segment RL4 linearly extend, respectively, in the direction of extension of the outer peripheral wiring CN.

Next, a brief description is given of an exposure process for curing the sealant SE.

As illustrated in FIG. 5, in the display panel PNL in which the liquid crystal layer LQ is held between the array substrate AR and the counter-substrate CT, each of the array substrate AR and the counter-substrate CT is formed by using a transparent insulative substrate such as a glass substrate or a resin substrate. Since the peripheral light-shield layer 521 is disposed on the counter-substrate CT side, light irradiation for curing the sealant SE, which is formed of the photosensitive resin material, is performed from the back side of the array substrate AR. The light source for curing the sealant SE is a light source which radiates light including wavelengths which are necessary for curing the sealant SE. For example, in the case where the sealant SE is formed of an ultraviolet-curing resin material, a light source which radiates light including ultraviolet wavelengths is applied as the light source. Radiation light emitted from such a light source has divergence.

In the example illustrated in FIG. 5, various wiring lines, which block light, are disposed on the array substrate AR, on the active area ACT side of the peripheral area PRP. However, since the line width of these wiring lines is small, the radiation light emitted from the light source passes through gaps between the various wiring lines and travels around, and reaches substantially the entirety of the sealant SE that is located above the various wiring lines.

At a position immediately above the outer peripheral wiring CN with a large line width, since no gap, such as a slit, is formed in the outer peripheral wiring CN, the radiation light from the light source is blocked by the outer peripheral wiring CN. However, radiation light, which has passed through the first peripheral insulation film 51 from around the outer peripheral wiring CN, directly reaches the sealant SE, for example, by traveling around just above the outer peripheral wiring CN, or is reflected by the second reflective surface RF2 of the reflective layer RL toward the first reflective surface RF1. In particular, radiation light, which has entered from a gap between the outer peripheral wiring CN and a neighboring wiring line thereof and has passed through the first peripheral insulation film 51, is reflected by the second reflective surface RF2 of that protrusion portion of the reflective layer RL, which extends outward from the end portion of the outer peripheral wiring CN, and this radiation light is repeatedly reflected between the first reflective surface RF1 and second reflective surface RF2. Thus, the radiation light is guided through the first peripheral insulation film 51, and reaches the sealant SE from the gap between the segments of the reflective layer RL. The radiation light with divergence travels around after passing through the periphery of the outer peripheral wiring CN or through the gap between the segments of the reflective layer RL, and reaches substantially the entirety of the sealant SE. It is thus possible to sufficiently cure the entirety of the sealant SE including the region immediately above the outer peripheral wiring CN.

As in the example illustrated in FIG. 6, in the case where each of the segments extending outward from both end portions of the outer peripheral wiring CN is formed in the island shape, the amount of reflective light, which is guided through the first peripheral insulation film 51 by the reflection on the second reflective surface RF2 of the reflective layer RL, is small. However, since the radiation light passes through the gaps between the discretely arranged segments and sufficiently travels around above the segments, the light reaches substantially the entirety of the sealant SE.

As in the example illustrated in FIG. 7, in the case where each of the segments extending outward from both end portions of the outer peripheral wiring CN is formed in the strip shape, the amount of reflective light, which is guided through the first peripheral insulation film 51 by the reflection on the second reflective surface RF2 of the reflective layer RL, increases, compared to the example illustrated in FIG. 6. The light, which has passed through the gaps between the segments that are arranged in the width direction of the outer peripheral wiring CN, travels around, thereby reaching substantially the entirety of the sealant SE. Therefore, in each of the cases in which the reflective layers RL of the examples illustrated in FIG. 6 and FIG. 7 are applied, the entirety of the sealant SE can be cured.

In recent years, there has been an increasing demand for a decrease in size of a liquid crystal display device and an increase in screen size, and there is a tendency that the width of a picture frame, which surrounds the active area ACT that displays an image, becomes smaller. On the other hand, there has been an increasing number of models which require the outer peripheral wiring CN at the periphery of the active area ACT, for the purpose of an antistatic measure, etc. In the display panel PNL with a narrowed picture frame, it is difficult to secure a large width between the active area ACT and the sealant SE, and a part of the sealant SE is formed to overlap the outer peripheral wiring CN. In order to cure the sealant SE which is formed of a photosensitive resin material, it is necessary to radiate light on the sealant SE. However, since the outer peripheral wiring CN is formed of the same wiring material as the gate line, etc., the outer peripheral wiring CN blocks light which is radiated onto the sealant SE. Thus, light hardly reaches a region immediately above the outer peripheral wiring CN, and a part of the sealant SE tends to becomes non-cured. If the non-cured sealant SE comes in contact with the liquid crystal layer LQ, there is a concern that impurities contained in the sealant SE cause contamination of the liquid crystal layer LQ. In addition, there is a concern that the non-cured sealant SE causes a decrease in adhesive strength for attaching the paired substrates, and a decrease in adhesion to each substrate, thus degrading reliability. Furthermore, in order to secure the stability in potential that is supplied to the outer peripheral wiring CN, and to avoid an increase in line width of the outer peripheral wiring CN in accordance with a demand for a narrower picture frame, it is difficult to apply such a technique that a slit is provided in the outer peripheral wiring CN, thereby making it easier to radiate light on the sealant SE.

Taking the above into account, in the present embodiment, the reflective layer RL, which is opposed to the outer peripheral wiring CN, is provided. Thereby, the light, which is radiated in order to cure the sealant SE, is guided while being reflected by the first reflective surface RF1 of the outer peripheral wiring CN and the second reflective surface RF2 of the reflective layer RL, thus making the light reach the sealant SE which is located immediately above the outer peripheral wiring CN. Thereby, the radiation light reaches substantially the entirety of the sealant SE, and non-curing of the sealant SE can be suppressed. Accordingly, even if the sealant SE and the liquid crystal layer LQ come in contact, it is possible to suppress elution of impurities from the sealant SE into the liquid crystal layer LQ, and to suppress degradation in display quality due to contamination of the liquid crystal layer LQ. Besides, it is possible to secure the adhesive strength between the sealant SE and the array substrate AR and counter-substrate CT. Moreover, since there is no need to provide a gap, such as a slit, in the outer peripheral wiring CN, it becomes possible to secure the stability in potential that is supplied to the outer peripheral wiring CN, without increasing the line width of the outer peripheral wiring CN. Therefore, the reliability can be enhanced.

In the structure in which the reflective layer RL is provided on the array substrate AR, the reflective layer RL is formed by using a metallic material with a high reflectance, which is located in a layer above the outer peripheral wiring CN. For example, in the case where the outer peripheral wiring CN is located in the same layer as the gate line, the reflective layer RL may be formed of the same material as the source line S, or may be formed of the same material as the pixel electrode PE or the first common electrode CE1. In addition, in order to form the reflective layer RL, it may be possible to add a layer which is different from the layer of the source line S or the pixel electrode PE and first common electrode CE1.

Next, another structure example will be described.

Figure 8:
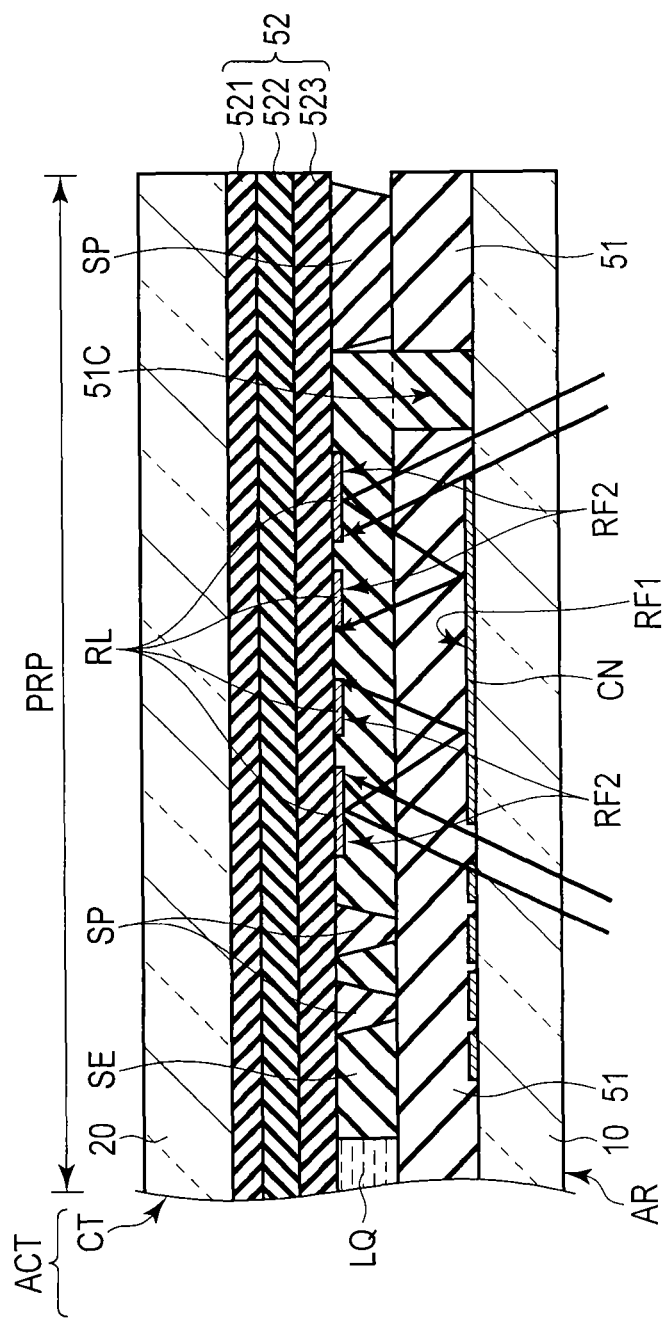
FIG. 8 is a cross-sectional view which schematically illustrates another example of the structure of the peripheral area PRP of the display panel PNL shown in FIG. 1.

FIG. 8 is a cross-sectional view which schematically illustrates another example of the structure of the peripheral area PRP of the display panel PNL shown in FIG. 1.

The structure example illustrated in FIG. 8 differs from the structure example illustrated in FIG. 5 in that the reflective layer RL is provided on the counter-substrate CT. Specifically, the reflective layer RL is formed on that surface of the second peripheral insulation film 52, which is opposed to the first peripheral insulation film 51. Specifically, the reflective layer RL is formed on that surface of the peripheral overcoat layer 523, which is opposed to the first peripheral insulation film 51, the peripheral overcoat layer 52 being continuous with the overcoat layer. The second reflective surface RF2 corresponds to a front surface of the reflective layer RL, that is, the surface opposed to the first peripheral insulation film 51. This reflective layer RL is formed of a plurality of segments which are mutually spaced apart. The positional relationship between the reflective layer RL and outer peripheral wiring CN is as illustrated in FIG. 6 and FIG. 7. In addition, the material, of which the reflective layer RL is formed, is as has been described with reference to FIG. 5.

With this structure example, the same advantageous effects as in the example illustrated in FIG. 5 can be obtained.

In the structure in which the reflective layer RL is provided on the counter-substrate CT, the reflective layer RL may be formed of the same material as the second common electrode CE2 which is located in the same layer. In particular, in this embodiment, in the counter-substrate CT, the second common electrode CE2 is formed in the part overlapping the black matrix BM, and is not formed in the aperture portion AP. Thus, unlike other liquid crystal modes, there is no need to form the second common electrode CE of the transparent, electrically conductive material (ITO, etc.). Thus, the second common electrode CE2 may be formed of a metallic material with a high reflectance of light (e.g. aluminum, titanium, molybdenum, tungsten, or silver). Thus, in the liquid crystal mode of the present embodiment, the reflective layer RL for curing the sealant can be formed on the counter-substrate CT, without affecting optical characteristics or increasing the number of fabrication steps.

Incidentally, in the structure example illustrated in FIG. 8, it is not necessary that the reflective layer RL be formed in the same layer as the second common electrode CE2. For example, in the counter-substrate CT, the reflective layer RL may be formed in a layer different from the layer of the second common electrode CE2.

As has been described above, according to the present embodiment, a liquid crystal display device, which can enhance reliability, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate including an outer peripheral wiring which is formed along an outer periphery of an active area that displays an image, and which has a first reflective surface, and the first substrate including a first insulation film covering the outer peripheral wiring;
   a second substrate including a second insulation film opposed to the first insulation film;
   a reflective layer which is located between the first insulation film and the second insulation film and is formed by a plurality of segments that are mutually spaced apart, the reflective layer having a second reflective surface opposed to the first reflective surface;
   a sealant formed of a photosensitive resin material, which surrounds the active area, is formed along the outer peripheral wiring, and attaches the first substrate and the second substrate in a state in which a cell gap is created between the first substrate and the second substrate; and
   a liquid crystal layer held in the cell gap in an inside surrounded by the sealant,
   wherein the reflective layer includes a first segment which is opposed to a first end portion of the outer peripheral wiring, the first end portion being located on an active area side, and extends to the active area side from the first end portion, and a second segment which is opposed to a second end portion of the outer peripheral wiring, the second end portion being located on an end portion side of the first substrate, and extends to the end portion side of the first substrate from the second end portion.

2. The liquid crystal display device of claim 1, wherein the reflective layer is formed on a first surface of the first insulation film, the first surface being opposed to the second insulation film, or the reflective layer is formed on a second surface of the second insulation film, the second surface being opposed to the first insulation film.

3. The liquid crystal display device of claim 1, wherein each of the segments is formed in an island shape or a stripe shape.

4. The liquid crystal display device of claim 1, wherein the reflective layer further includes a third segment of a stripe shape between the first segment and the second segment, the third segment extending in a direction of extension of the outer peripheral wiring.

5. The liquid crystal display device of claim 1, wherein the outer peripheral wiring and the reflective layer are formed of a material including titanium (Ti), aluminum (Al), molybdenum (Mo), tungsten (W) or silver (Ag).

* * * * *